United States Patent [19]

Muirhead

[11] 3,908,069

[45] Sept. 23, 1975

[54] COATED PARTICULATE VINYL AROMATIC POLYMERS

[75] Inventor: Leslie A. Muirhead, Wilmslow, England

[73] Assignee: Shell Oil Company, Houston, Tex.

[22] Filed: Mar. 29, 1974

[21] Appl. No.: 456,329

[30] Foreign Application Priority Data

Apr. 13, 1973 United Kingdom.............. 17898/73

[52] U.S. Cl................ 428/407; 260/2.5 B; 427/222
[51] Int. Cl.² .......................................... B32B 27/02
[58] Field of Search ............ 117/100 C; 260/2.5 B; 428/407; 427/222

[56] References Cited
UNITED STATES PATENTS

| | | | |
|---|---|---|---|
| 3,304,274 | 2/1967 | Eng................................ | 117/100 C |
| 3,461,088 | 8/1969 | Stahnecker et al............ | 117/100 C |
| 3,553,114 | 1/1971 | Burt................................ | 117/100 C |
| 3,627,713 | 12/1971 | Maruta............................ | 117/100 C |
| 3,793,242 | 2/1974 | Slavsky .......................... | 117/100 C |
| 3,817,879 | 6/1974 | Walter et al.................... | 117/100 C |
| 3,853,453 | 9/1958 | Elton et al....................... | 252/8.75 |

OTHER PUBLICATIONS

Chem. Abstract Article 768*d* Vol. 51, 1956.
Chem. Abstract Article 5169*d* Vol. 54, 1959.

*Primary Examiner*—William D. Martin
*Assistant Examiner*—Dennis C. Konopacki

[57] ABSTRACT

Expandable particles of a polymer of a vinyl aromatic compound coated with certain straight chain aliphatic substituted 1-hydroxyethyl imidazolines and a process for their preparation are disclosed.

9 Claims, No Drawings

COATED PARTICULATE VINYL AROMATIC POLYMERS

BACKGROUND OF THE INVENTION

The present invention relates to expandable polymers of vinyl aromatic compounds in the form of coated particles and to a process for the manufacture of these coated particles.

The manufacture of cellular molded blocks or articles from expandable particles is well-known and involves essentially two steps, (a) pre-expansion of the expandable particles followed by a maturing stage and (b) heating the pre-expanded particles in a mold to form a cellular structure therein. For ease of handling and in order to obtain satisfactory moldings it is desirable that the particles are free-flowing and that their tendency to agglomerate before, during and after pre-expansion is avoided as far as possible.

SUMMARY OF THE INVENTION

According to the invention a satisfactory coating composition has been found for application to the expandable particles which largely prevents agglomeration of the expandable particles.

The present invention provides coated expandable particles of a polymer of a vinyl aromatic compound wherein the coating comprises an aliphatic substituted 1-hydroxy-ethyl-imidazoline and more preferably a 1:2 1-hydroxyethyl-2-alkylimidazoline.

The invention also provides a process for the manufacture of the coated expandable particles of a polymer of a vinyl aromatic compound, which comprises contacting expandable particles of a polymer of a vinyl aromatic compound with a coating composition comprising an aliphatic substituted 1-hydroxyethyl imidazoline.

DESCRIPTION OF PREFERRED EMBODIMENTS

The aliphatic substituted 1-hydroxyethyl imidazoline has the following formula:

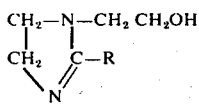

in which R represents a straight chain aliphatic group selected from alkyl and alkenyl. Preferred are imidazolines wherein R represents an alkyl group containing an odd number of carbon atoms in the range from about $C_{11}$ to about $C_{21}$. Imidazolines wherein the substituent R represents an alkenyl group from $C_{11}$ to $C_{21}$ may also be employed. Particularly good results have been obtained with compounds of the above formula in which R is a $C_{11}$ alkyl radical, a $C_{13}$ alkyl radical or a $C_{17}$ alkyl radical. The $C_{11}$ compound is commercially available as "CASAMINE CH", the $C_{13}$ compound as "CASAMINE MH" and the $C_{17}$ compound as "CASAMINE SH", the manufacturer being Thomas Swann of County Durham, UK.

The molding properties of the imidazoline-coated particles are considerably improved by including a surfactant in the coating, and preferably a non-ionic surfactant such as an oxyethylated phenol or oxylated alkyl phenol. "Nonidet P40" which is a commercially available condensate of an octylphenol and, on average, 9 moles of ethylene oxide is particularly useful in this respect. Many other surfactants are described in e.g. McCutcheon's Detergents and Emulsifiers, 1972 Annual, Allured Publishing Corp.

The ratio of imidazoline to surfactant in the coating may be about 2:1 but ratios in the range 1:2 to 4:1 are quite satisfactory.

The coating may be present on the expandable particles in an amount in the range from about 0.01 to about 1.0% by weight of the expandable particles, preferably in the range 0.05 to 0.20 by weight.

The term "polymer of a vinyl aromatic compound" as used in this specification includes homopolymers of vinyl aromatic compounds and copolymers of such compounds with olefinically unsaturated monomers, as well as graft polymers of vinyl aromatic compounds with polymers of alkadienes, such as polybutadiene and styrene-butadiene copolymers. It will be understood that the vinyl aromatic compound may have alkyl substituents on the vinyl group, e.g. methyl and ethyl groups. Examples of vinyl aromatic compounds are styrene, alpha-methylstyrene, the vinyl toluenes, and the halogen substituted styrenes. For economic reasons the preferred polymer is homopolystyrene, and although the invention is not restricted to polystyrene, the description will hereafter refer to polystyrene for the sake of convenience.

As is well known expandable polystyrene particles contain a vaporizable expanding agent which causes the particles to expand or foam when heat and/or steam is applied to them. The expanding agent may be any material which has a boiling point or boiling range under normal pressure below 100°C and which has substantially no solvent action on the polystyrene. Examples of expanding agents are saturated aliphatic or cycloaliphatic hydrocarbons having 3 to 7 carbon atoms, e.g. propane, butane, pentane and cyclohexane, or halogenated hydrocarbons having 1 to 6 carbon atoms e.g. fluorinated hydrocarbons, or other materials such as petroleum ether. The amount of expanding agent present in the particles should be sufficient to produce a cellular mass, but generally speaking should be present to the extent of 2–20% by weight based on the polymer.

The expandable particles are conveniently manufactured in the form of beads or pearls by suspension or emulsion polymerization techniques, the expanding agent such a pentane or a pentane/isopentane mixture being incorporated therein during or after polymerization.

The coating composition containing the imidazoline and optionally the surfactant may be applied to the expandable particles by any convenient technique. The ingredients of the composition may be applied separately or together and in any order. However, it is most convenient to apply the coating composition dissolved in a solvent for the ingredient or ingredients and coat the expandable particles with the resulting solution. The solvent is preferably a readily vaporizable non-aqueous liquid which has no solvent action on the expandable particles e.g. a lower alcohol such a methanol, ethanol, isopropanol or an aliphatic hydrocarbon such as hexane, heptane or petroleum ether. The commercially available product "Industrial Methylated Spirit" is particularly useful for this purpose.

The coated expandable particles according to the invention readily undergo pre-expansion and molding procedures without clogging or otherwise interfering with the handling equipment which transfers pre-expanded beads to the mold. Flow of the raw bead i.e. before pre-expansion, is also excellent and causes no difficulty. The coating agent employed also has no deleterious effect on the strength of the molded articles.

In the manufacture of expanded polystyrene ceiling tiles and other sheet material, large blocks of expanded material are sliced or cut into thin sheets by means of a hot wire cutter and the grade of expandable polystyrene required for this purpose has to be such that it does not contain ingredients which interfere with the cutting action of the hot wire and hence with the surface finish of the cut tiles. The particles coated with an imidazoline/surfactant mixture according to the present invention are especially useful for producing tiles and sheet material in that blocks molded from the particles readily undergo hot wire cutting and produce a blemish-free finish to the cut surfaces.

It may be desirable for certain molding grades of expandable polystyrene particles to include a mold lubricant in the coating, for example in the production of thin-walled drinking cups. Thus, where particles are required for this purpose it is desirable to include a lubricant in the coating so that a subsequent lubricant treatment step is avoided. A typical example of such a lubricant is the metal salt of a long chain fatty acid e.g. zinc stearate.

The invention will be further illustrated by the following Examples. In these Examples the imidazoline coating agents have been given the following references:

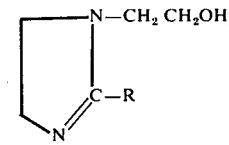

R = $C_{11}$ alkyl     Imidazoline A

R = $C_{17}$ alkyl     Imidazoline B

EXAMPLES I AND II

20kg of expandable polystyrene beads containing about 6% by weight of a mixture of n-pentane and iso-pentane were tumbled in a Rotocube Mixer with a solution of an imidazoline in industrial methylated spirits. The beads were tumbled with a sufficient quantity of the solution to form, after evaporation. of the solvent, a coating on the beads of 0.025% by weight on an average basis.

The coated beads were pre-expanded in a continuous pre-expander using a steam/air mixture to give beads having a bulk density of about 16kg/m³.

The results of agglomeration tests carried out on the pre-expanded material are given in the following table.

| Example | Coating Agent | Color of Coating Agent | Agglomeration (%) |
|---|---|---|---|
| 1 | Imidazoline A | light brown | 0.4 |
| 2 | Imidazoline B | amber | 0.6 |
| Comparison | CASA CGA* | very dark brown | 0.8 |

*CASA CGA is a coating agent covered by British Patent No. 1,132,147 and is the reaction product of diethylene triamine and coconut fatty acids.

It will be seen that the imidazole coating agents give better agglomeration performance that the known material and furthermore they have an acceptable color which does not substantially affect the color of the coated beads.

Example III

Expandable polystyrene beads were coated with an imidazoline/surfactant coating according to the procedure of Examples I and II.

The coated beads were pre-expanded, allowed to mature overnight, and were machine molded into blocks 4 feet by 4 feet by 20 inches in a steam-heated enclosed mold in accordance with conventional practice. The mold cooling time (i.e. the time taken for the plaque to equilibrate with the atmosphere to enable it to be removed from the mold without distortion) was noted. The flexural strength of the molded plaque was also measured. The results appear below:

| Example | Coating Agent | Concentration of Coating Agent on bead (%w) | Cooling Time (min) | Flexural Strength (kN/m$^{-2}$) |
|---|---|---|---|---|
| 3 | Imidazoline A/Nonidet P40 mixture* | 0.08 | 19 | 236 |
| Comparison | CASA CGA | 0.08 | 21 | 186 |

*The ratio of Imidazoline A to Nonidet P.40 is 2:1

From the above results, it is apparent that the beads coated according to the invention give advantages in terms of mold cooling time and particularly in terms of flexural strength as compared with the beads coated with the known coating agent.

Examples IV and V

Expandable polystyrene beads were coated according to the procedure of Examples I and II and their flow properties assessed by measuring the time taken for the coated beads to flow through a standard funnel. The results were as follows:

| Example | Coating Agent | Concentration of Coating Agent (%w) | Bead Flow (secs) |
|---|---|---|---|
| 4 | Imidazoline A | 0.09 | 12.5 |
| 5 | Imidazoline A/Nonidet P.40 | 0.09 | 13.0 |
| Comparison | CASA CGA | 0.09 | 28.0 |

It will be seen that the raw bead flow properties are very much better than the beads coated with the known coating agent and are, therefore, more readily manageable, particularly in pre-expansion apparatus.

What is claimed is:

1. Coated unexpanded expandable particles of a polymer of a vinyl aromatic compound in which the coating is a straight chain aliphatic substituted 1-hydroxyethylimidazoline in an amount sufficient to render the particles free flowing and having reduced tendency to agglomerate before, during and after prexpansion.

2. Coated expandable particles as in claim 1 in which the coating comprises a 1 hydroxyethyl-2-alkylimidazoline.

3. Coated expandable particles as in claim 2 in which the alkyl group contains an odd number of carbon atoms in the range from about $C_{11}$ to about $C_{21}$.

4. Coated expandable particles as in claim 1 wherein the coating contains a surfactant and the ratio of said imidazoline to surfactant is in the range from 1:2 to 4:1.

5. Coated expandable particles as in claim 4 wherein the surfactant is nonionic.

6. Coated expandable particles as in claim 1 wherein the coating is present in an amount in the range from about 0.01 to about 1.0% by weight of the expandable particles.

7. A process for the manufacture of free flowing coated unexpanded expandable particles of a vinyl aromatic polymer which comprises contacting unexpanded expandable particles of a polymer of a vinyl aromatic compound with a solution of a straight chain aliphatic substituted 1-hydroxyethyl imidazoline in a nonaqueous vaporizable solvent, and evaporating the solvent.

8. A process as in claim 7 wherein in step (a) the solution contains a surfactant and the ratio of said imidazoline to surfactant is in the range from 1:1 to 4:1.

9. A process as in claim 7 wherein the solvent is at least one lower alcohol.

* * * * *